Dec. 2, 1930.  J. J. LAWLER  1,783,574
THERMOSTAT
Filed Jan. 31, 1929  3 Sheets-Sheet 1
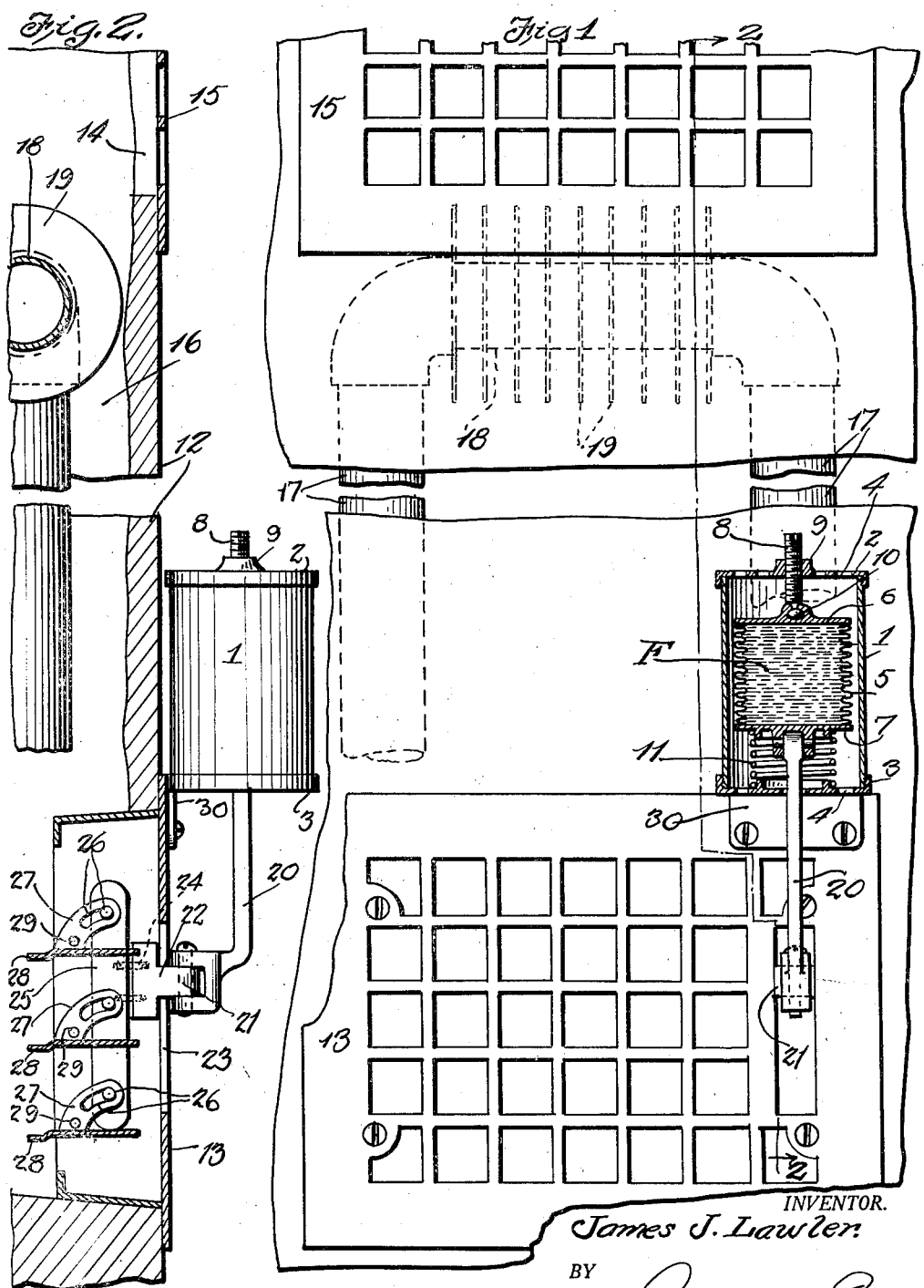
INVENTOR.
James J. Lawler
BY
Bryant & Lowry
ATTORNEY.

Dec. 2, 1930. J. J. LAWLER 1,783,574
THERMOSTAT
Filed Jan. 31, 1929 3 Sheets-Sheet 2
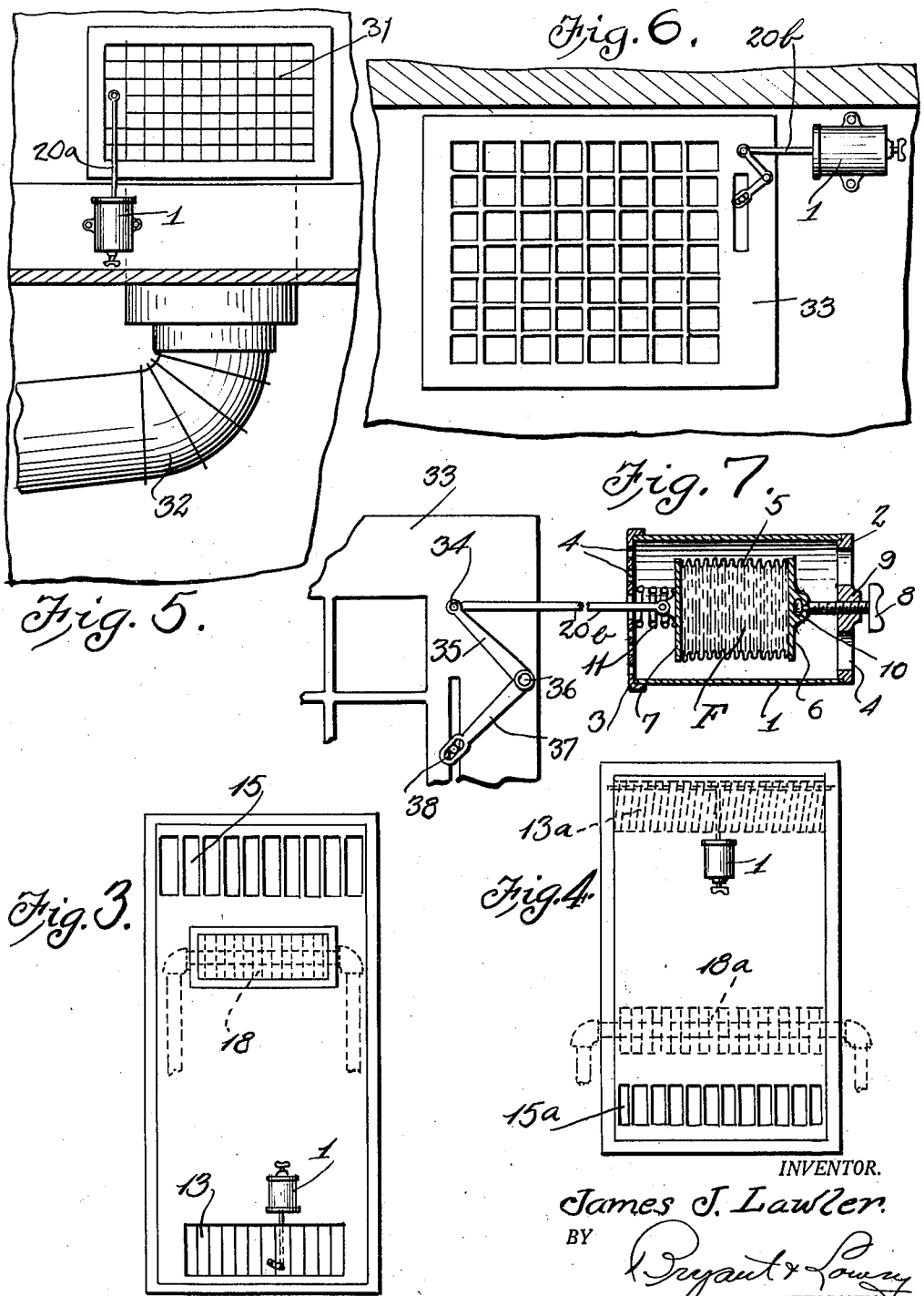

Dec. 2, 1930.  J. J. LAWLER  1,783,574
THERMOSTAT
Filed Jan. 31, 1929   3 Sheets-Sheet 3

INVENTOR.
James J. Lawler.
BY
Bryant & Lowry
ATTORNEYS.

Patented Dec. 2, 1930

1,783,574

UNITED STATES PATENT OFFICE

JAMES J. LAWLER, OF MOUNT VERNON, NEW YORK

THERMOSTAT

Application filed January 31, 1929. Serial No. 336,555.

This invention relates to certain new and useful improvements in thermostatic controllers for draft dampers and has for one of its objects to provide a thermostatic control for hot air registers and the like operating to open the register when the temperature of a room reaches a predetermined degree and further operating for closing the register when the temperature of the room is lowered.

A further object of the invention is to provide a thermostat control for draft dampers in which draft openings communicating with each other through a wall partition and arranged adjacent and above the floor line of a room has a thermostatically controlled shutter associated with the lower draft opening to control the inlet of cold air to the chamber within the wall that contains a heating element over which the cold air passes to be heated for outletting through the upper draft opening.

The thermostatic control is adapted for association with shutters of registers for hot air furnaces of the type embodying hot air flues and also of the pipeless form whereby the temperature of a room may be easily controlled.

It is also intended that the thermostatic control may be associated with steam and hot water heating systems in addition to the hot air registers, or wherever a damper, shutter, or valve is to be controlled.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a fragmentary front elevational view, partly in section, showing the wall with a lower shutter controlled register and an upper grille covered draft opening, the heating elements in the wall compartment and the thermostatic control for the register shutter shown in section;

Figure 2 is a vertical cross-sectional view taken on line 2—2 of Figure 1 showing the heating element in the wall compartment interposed between the lower cold air inlet and the upper hot air outlet and the thermostatic device controlling the shutters of the lower register;

Figure 3 is a diagrammatic front elevational view of the illustration in Figure 1;

Figure 4 is a diagrammatic front elevational view, similar to Figure 3 showing the cold air inlet adjacent the floor line and the thermostatically controlled shutter or register at the upper end of the wall, the parts being reversed as illustrated in Figure 3;

Figure 5 is a fragmentary elevational view showing the hot air pipe from a hot air furnace communicating with a wall register adjacent the floor line that has its shutters thermostatically controlled;

Figure 6 is a fragmentary top plan view showing a thermostatically controlled register in the floor for a pipeless furnace;

Figure 7 is a fragmentary enlarged plan view of a floor register shown in Figure 6 with the thermostatic control device shown in section;

Figure 10:
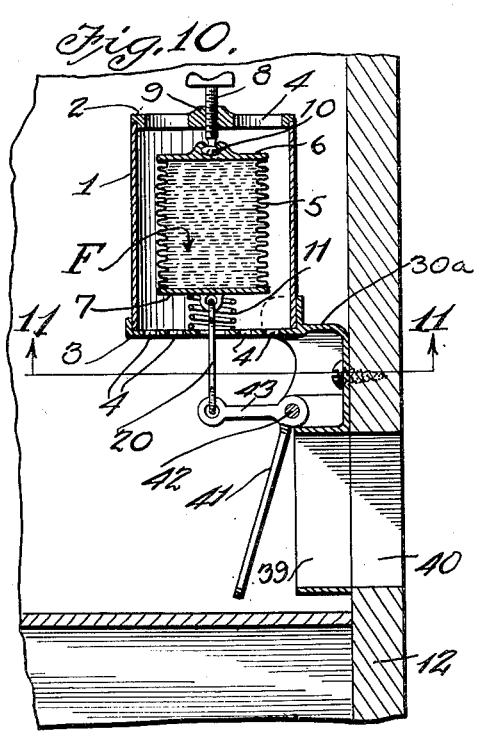
Figure 10 is a vertical cross-sectional view taken on line 10—10 of Figure 8.

The thermostatic device as illustrated in the different forms of the invention comprises a cylindrical wall 1 constituting a casing with removable top and bottom walls 2 and 3 respectively that are apertured as at 4 to permit a free flow of surrounding air through the casing. The thermostatic element of the device comprises an expansible tube or bellows 5 secured at their opposite ends by spot welding or the like to metallic end plates 6 and 7, the expansible tube 5 being completely filled in any suitable manner to the exclusion of all air with a volatile fluid F. A support for the expansible tube 5 within the casing 1 has a screw 8 threaded through the central boss 9 in the upper end wall 2 with the lower end of the screw 8 having a swivel connection 10 with the upper end plate 6. A coil spring 11 is interposed between the lower end plate 7 and bottom wall 3 as illustrated, normally tending to compress the tube or bellows 5 when the volatile fluid F therein contracts.

As shown in Figures 1 and 2, the reference numeral 12 designates a room wall having an opening therein adjacent the floor line in which a register 13 is set, while the upper end of the wall adjacent the ceiling has an air outlet opening 14 covered by a facing grille 15. A compartment or heating chamber 16 is formed in the wall 12 with a heat supplying pipe 17 therein for a heating medium, the pipe 17 including a horizontal section 18 carrying heat radiating fins 19. Cold air is admitted through the register 13 and in passing upwardly through the chamber 16 is heated by the radiating fins 19 and pipes 17 and 18, and outlets through the opening 14 into the room. The register 13 is shutter controlled and the thermostatic device is associated with the shutters of the register. As illustrated, the arm 20 has its upper end connected to the lower end plate 7 of the expansible tube 5 and depends from the casing 1 to a central opening in the bottom wall 3, the lower end of the arm 20 being connected as at 21 to the block 22 vertically slidable in the slot 23 formed in the front wall of the register 13, the block being connected as at 24 to the link 25 that has a pin and arcuate slot connection 26 with the curved arms 27 carried by the shutters 28 that are pivotally mounted as at 29 upon the opposite side walls of the register 13.

The screw 8 may be adjusted to cause the shutters 28 to be opened and closed at predetermined temperatures. Assuming that the shutters 28 are in their open position as illustrated in Figure 2, cold air from the room will enter the register 13 and pass upwardly over the heating element of the chamber 16 and outwardly through the opening 14 for return in a heated condition into the room. When the air in the room has reached a predetermined temperature, the bellows 5 or expansible tube will expand against the tension of the spring 11 due to the heated air in the room circulating through the casing 1 in contact with the expansible tube, the arm 20 being lowered for operating the link 25 and shutters 28 connected thereto, thereby shutting off the register 13 and preventing the circulation of air through the heating chamber 16 in the wall 12. When the temperature in the room lowers, the cooler air circulating through the casing 1 causes a contraction of the volatile fluid F within the bellows 5, the spring 11 moving the lower end plate 7 of the bellows in an upward direction and shifting therewith the arm 20 for again opening the shutters 28 so that air can again flow through the register 13, upwardly through the heating chamber 16 and out to the opening 14 into the room. A full front elevational view of this arrangement of the invention is diagrammatically illustrated in Fig. 3 in which the thermostatically controlled shutter is adjacent the floor line and the heated air outlet adjacent the ceiling, the heating element being interposed between the cold air inlet and the hot air outlet. A reversal of these parts is shown in Figure 4, the cold air inlet 14a being adjacent the floor line and the hot air outlet 13a being adjacent the ceiling, the thermostatic device being associated with the hot air outlet that comprises damper controlled shutters, the air heating element 18a being located adjacent the floor line air inlet 15a. In this form of the invention, cold air is freely admitted to the heating chamber 16, but the outlet thereof into the room through the register 13a is controlled by the thermostatic device located within the room. As shown in Figures 1 and 2, the thermostatic casing 1 is carried by a bracket extension 30 from the bottom wall 3 that may be mounted upon the wall 12 or register 13.

In the form of the invention shown in Figure 5, the thermostatic device is associated with a wall register 31 constituting an outlet for heated air passing through the pipe 32 from a hot air furnace, the thermostatic device 1 having the arm 20a extending from the expansible tube to the shutter mechanism of the register 31.

The thermostatic device as shown in Figures 6 and 7 is associated with a floor register 33 of the type usually employed with a pipeless furnace, the arm 20b from the thermostatic device 1 being pivotally connected at its outer end as at 34 with one arm 35 of a bell crank lever that is pivoted as at 36 to the register 33. The other arm 37 of the bell crank lever has a pin and slot connection 38 with the shutter mechanism of the register 33 that is operated upon expansion and contraction of the volatile fluid F in the bellows 5.

Figure 8:
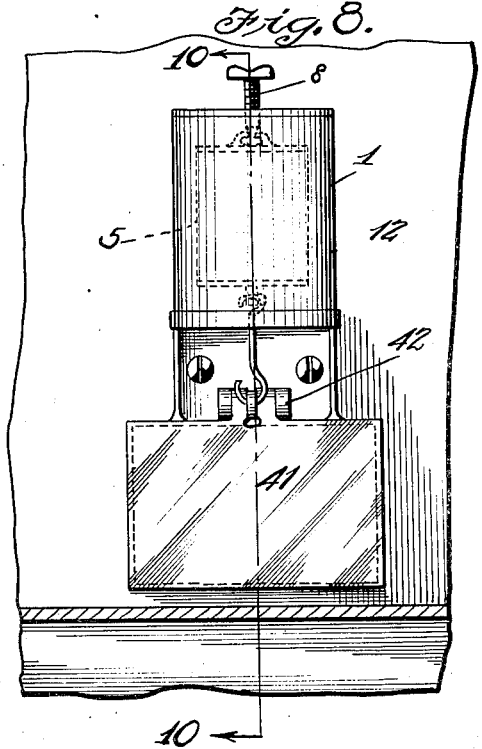
Figure 8 is a front elevational view of another form of thermostatic control device showing a flap valve thermostatically operated for controlling a cold air inlet for a wall compartment containing a heating element.
Figure 11:
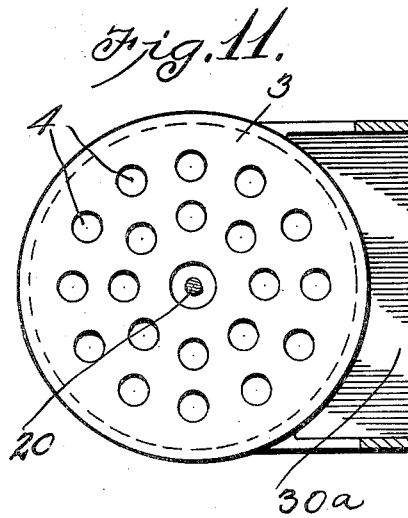
Figure 11 is an enlarged horizontal sectional view taken on line 11—11 of Figure 10.
Figure 9:
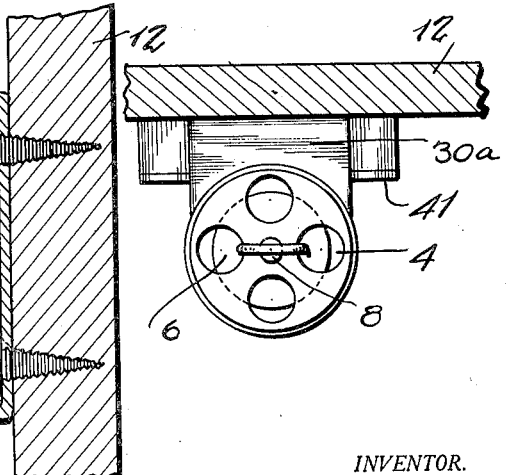
Figure 9 is a top plan view of the thermostatic device shown in Figure 8.

In the form of the invention shown in Figures 8 to 11, the casing 1 of the thermostatic device being mounted upon the bracket 30a that has a depending frame wall 39 constituting a valve seat aligned with the air inlet opening 40 in the room wall 12, a flap valve or damper 41 is pivotally connected as at 42 to the upper end of the frame wall 39 and carries an angularly directed arm 43 having a link connection 20 with the lower end plate 7 of the expansible tube. The flap valve 41 is opened and closed relative to the seat on the frame wall 39 due to temperature changes in the room and expansion and contraction of the volatile fluid F, the spring 11 compressing the expansible tube 5 when the volatile fluid contracts to raise the arm 43 and flat valve 41. When the temperature in the room is increased, the volatile fluid expands and causes an expansion of the tube bellows 5 for lowering the arm 43 and flap valve 41 upon its seat 39.

From the above detailed description of the invention, it is believed that the construction and operation thereof will at once be apparent, and while there are herein shown and described the preferred embodiments, of the present invention, it is nevertheless to be understood that minor changes may be made therein without departing from the spirit and scope of the invention as claimed.

I claim:—

1. A thermostat of the character and for the purposes described, comprising a casing, a pair of spaced disks, one of which is rigid and the other movable, a bellows like tube connecting the two disks, a swivelled screw threaded through one end of the casing and attached to the rigid disk, a spring located in said casing between the movable disk and the end of the casing, and a link attached to the movable disk and projecting from the casing, said link passing axially through the spring.

2. A thermostat for the purpose described, comprising a casing, a pair of spaced and rigid disks in said casing, a bellows-like tube connecting said disks to form a closed chamber, an adjusting screw threaded through one end of the casing and having swivel connection with one of the disks, a coil spring within the casing and interposed between the remaining end of the casing and the second disk, and a link extending into the casing through said spring and having its end attached to said second disk.

In testimony whereof I affix my signature.

JAMES J. LAWLER.